April 16, 1935.  W. J. COULTAS  1,997,630
CORN HARVESTER
Filed Jan. 16, 1933
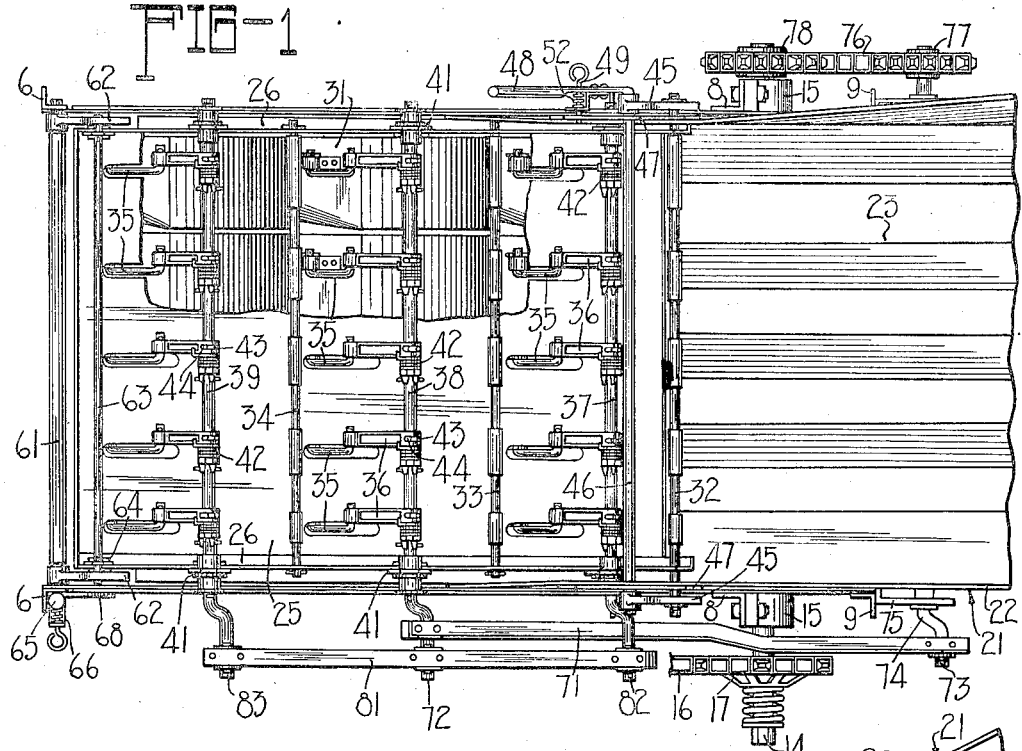
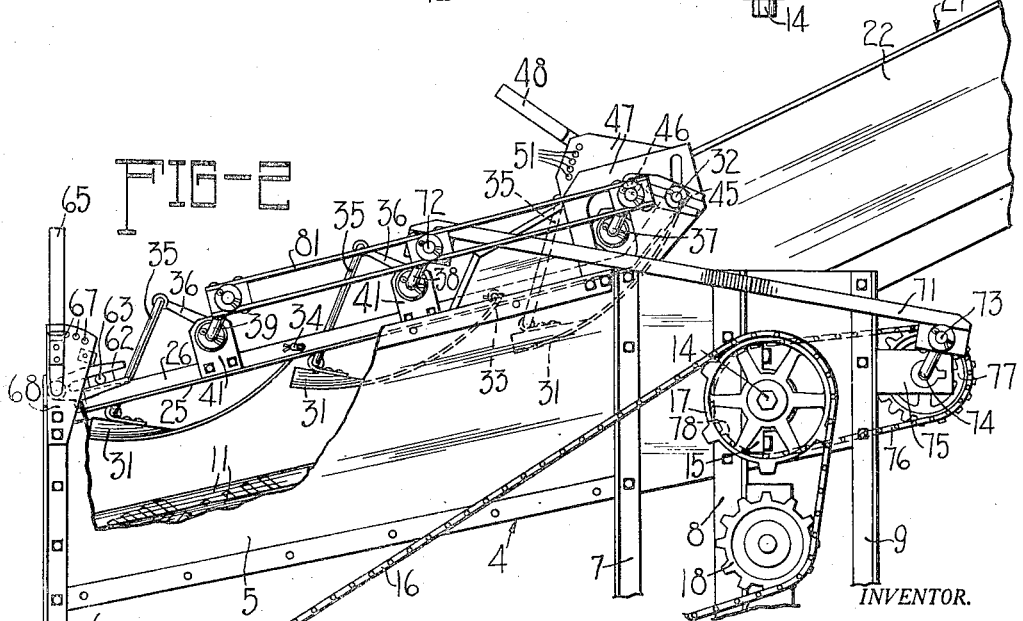
WITNESS.
Edward Melin.
INVENTOR.
BY Wilbur J. Coultas
ATTORNEY.

Patented Apr. 16, 1935

1,997,630

UNITED STATES PATENT OFFICE 1,997,630

CORN HARVESTER

Wilbur J. Coultas, Moline, Ill., assignor to Deere & Company, Moline, Ill., a corporation of Illinois Application January 16, 1933, Serial No. 651,885

2 Claims. (Cl. 130—5)

My invention relates to corn husking mechanisms such as are commonly used on corn harvesters and pertains particularly to that type of husking mechanism having a plurality of husking rolls with a series of ear retarders supported from a cover or other framework disposed over the rolls. The principal object of my invention is to provide a husking mechanism wherein the front end of the cover or framework supporting the retarders is adjustable toward or away from the husking rolls, whereby the size of the entrance to the husking rolls may be increased or decreased to accommodate varying quantities of material fed to the husking rolls.

Another object of the invention is to provide a husking mechanism wherein the cover with the retarders supported thereby may be raised or lowered with a bodily movement to adjust the position of the retarders relative to the rolls.

Other objects and advantages of my invention will be apparent to those skilled in the art after a consideration of the following detailed description, taken in conjunction with the accompanying drawing wherein:

Figure 1 is a plan view of the husking mechanism, a portion of the cover being broken away to show the ear retarders; and, Figure 2 is a side elevational view of the structure shown in Figure 1.

The husking mechanism comprises the usual inclined frame 4 having sides 5 secured to vertical supporting bars 6, 7, 8 and 9. The husking rolls 11 are journaled on frame 4 between the sides 5 and are rotated through a driving connection with a transverse drive shaft 14 journaled in bearing brackets 15 secured adjacent the upper end of bars 8. The transverse drive shaft 14 is driven by a drive chain 16 which engages over a sprocket 17, secured on one end of shaft 14. The drive chain 16 is maintained at the proper driving tension by means of a tightener sprocket 18.

The corn is delivered to the husking rolls from a hopper or chute 21 positioned adjacent the upper or front end of the husking mechanism and supported on bars 8 and 9. The hopper 21 includes sides 22 and a bottom 23. The hopper 21 is inclined downwardly toward the husking rolls 11 so that the corn will feed by gravity out of the hopper.

As the ears of corn move down along husking rolls 11 they come under the restraint of a plurality of oscillating retarding plates or shoes 31 hingedly connected to and depending from cover 25 provided above the rolls 11. The retarding plates 31 are disposed in a plurality of transverse rows and are of such dimensions as to be arranged in close proximity to each other to cover the entire space between sides 5 of the husking mechanism. The front transverse row of plates 31 is hingedly connected with a hinge rod 32 supported in aligned holes in the upwardly bent ends of side bars 26 extending along the sides of cover 25. The central and rear transverse rows of plates are hingedly connected with rods 33 and 34 respectively, also supported in aligned holes in side bars 26. The rear ends of retarding plates 31 are suspended on links 35 which are pivotally connected to the plates and to arms 36 extending rearwardly from and journaled on transverse rock shafts 37, 38 and 39. The rock shafts 37, 38 and 39 are positioned above cover 25 and are journaled in aligned bearing brackets 41 secured to side bars 26. Each arm 36 is yieldingly held in a normal position on its rock shaft by means of a spring 42 embracing the rock shaft, and having one end anchored to the arm and the other end to the rock shaft. The range of movement of the arm on the rock shaft is determined by a pin 43 on the shaft and extending through slots 44 in the hub of the arm.

It frequently happens that an excessive amount of trash is delivered with the corn to hopper 21 and accumulates at the entrance to the husking rolls. To overcome this difficulty I have provided means by the actuation of which the front end of cover 25 may be adjusted to vary the distance between husking rolls 11 and ear retarders 31 to admit larger quantities of material.

The means employed for adjusting the front end of cover 25 includes a pair of forwardly extending forked brackets 45 secured adjacent the ends of a transverse rock shaft 46 supported in brackets 47 secured to sides 5. The forked portions of brackets 45 extend over hinge rod 32 to support cover 25. The front end of cover 25 is adjusted by rocking the shaft 46. To facilitate rocking shaft 46, a lever 48 is secured on one end of the shaft. The cover 25 is held in any desired position of adjustment by means of a spring latch 49 on lever 48 engaging one of a series of holes 51 provided in the adjacent bracket 47.

The rear end of cover 25 is adjustably supported in a manner similar to that employed for supporting the front end. A transverse rock shaft 61 is mounted in aligned holes provided adjacent the upper ends of bars 6. Rock shaft 61 supports a pair of forwardly extending forked brackets 62 which engage a hinge rod 63 supported in brackets 64 secured on bars 26 adjacent the front ends thereof. A lever 65 is secured on one end of rock shaft 61 and serves as a means for rocking rock shaft 61 to vertically adjust the rear end of cover 25. The rear end of cover 25 is locked in the desired position of adjustment by a spring latch 66 cooperating with a series of holes 67 provided in a plate 68 secured to the adjacent bar 6.

By the provision of means for adjusting both ends of the cover 25 vertically, the cover can be adjusted bodily to and from the husking rolls to vary the spacing between the retarders and rolls. This makes it possible to adjust the retarders to any size of ear, or to adjust the pressure exerted by the retarders upon the ears. Furthermore, by manipulating the two levers separately, the position of the retarders at each end, or pressure exerted thereby, can be adjusted separately. When the front end of the cover is adjusted to change the size of the opening to the husking rolls, the position of the retarders with respect to the rolls is also changed. This can be compensated for by also adjusting the rear end of the cover in the opposite direction.

The retarding plates 31 are simultaneously oscillated by the rocking of rock shafts 37, 38 and 39. These rock shafts are rocked by a driving arm 71 journaled at one end on a crank 72 formed on one end of the central rock shaft 38, and at the other end on a crank 73 which is formed on a countershaft 74. Countershaft 74 is supported in brackets 75 secured on frame bars 9. The countershaft 74 is driven by a drive chain 76 which is trained over a sprocket 77 on countershaft 74 and a sprocket 78 secured on drive shaft 14. The shafts 37 and 39 are rocked simultaneously with shaft 38 by means of a pitman 81 which engages crankshaft 72 of shaft 38 and similar cranks 82 and 83 formed on shafts 37 and 39, respectively.

While I have described, in connection with the accompanying drawing, the specific form in which I prefer to embody my invention, it is to be understood that the invention is not to be limited to the specific means which I have herein shown and described, and that, in fact, widely different means may be employed in the practice of the broader aspects of my invention.

What I claim, therefore, and desire to secure by Letters Patent is:

1. In a husking mechanism comprising a frame and a plurality of husking rolls rotatably supported on said frame, a framework disposed over said rolls comprising two side members, a transverse rod supported by said side members adjacent the front end of the husking mechanism, a plurality of retarders pivotally supported on said rod and disposed over said rolls, a rock shaft rockably supported on said frame adjacent said rod, an arm on each end of the rock shaft engaging said rod, and means for rocking said rock shaft to adjust the position of said framework and retarders relative to said rolls.

2. In a husking mechanism comprising a frame and a plurality of husking rolls rotatably supported on said frame, a framework disposed over said rolls, a transverse rod supported on said framework, a plurality of retarders pivotally supported on said rod and disposed over said rolls, a rock shaft rockably supported on said frame adjacent said rod, an arm on each end of the rock shaft engaging said rod, and means for rocking said rock shaft to adjust the position of said framework and retarders relative to said rolls.

WILBUR J. COULTAS.